(12) United States Patent
Kumata

(10) Patent No.: US 12,432,474 B2
(45) Date of Patent: Sep. 30, 2025

(54) IMAGING DEVICE

(71) Applicant: SONY SEMICONDUCTOR SOLUTIONS CORPORATION, Kanagawa (JP)

(72) Inventor: Keishi Kumata, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 83 days.

(21) Appl. No.: 18/260,327

(22) PCT Filed: Dec. 10, 2021

(86) PCT No.: PCT/JP2021/045530
§ 371 (c)(1),
(2) Date: Jul. 4, 2023

(87) PCT Pub. No.: WO2022/153746
PCT Pub. Date: Jul. 21, 2022

(65) Prior Publication Data
US 2024/0056701 A1  Feb. 15, 2024

(30) Foreign Application Priority Data
Jan. 13, 2021 (JP) .................. 2021-003522

(51) Int. Cl.
*H04N 25/778* (2023.01)
*H04N 25/78* (2023.01)

(52) U.S. Cl.
CPC ........... *H04N 25/778* (2023.01); *H04N 25/78* (2023.01)

(58) Field of Classification Search
None
See application file for complete search history.

(56) References Cited

U.S. PATENT DOCUMENTS

2013/0242125 A1* 9/2013 Yang ............... H04N 25/78
  348/222.1
2019/0124285 A1* 4/2019 Otaka ............. H04N 25/575

FOREIGN PATENT DOCUMENTS

| JP | 2013-126015 A | 6/2013 |
| JP | 2016-092661 A | 5/2016 |
| WO | 2015/019836 A1 | 2/2015 |
| WO | 2016/194653 A1 | 12/2016 |
| WO | 2017/159394 A1 | 9/2017 |

OTHER PUBLICATIONS

International Search Report and Written Opinion of PCT Application No. PCT/JP2021/045530, issued on Mar. 1, 2022, 09 pages of ISRWO.

* cited by examiner

*Primary Examiner* — Mark T Monk
(74) *Attorney, Agent, or Firm* — CHIP LAW GROUP

(57) ABSTRACT

An imaging device capable of stabilizing its imaging performance is provided. The imaging device includes a photoelectric conversion element, a signal converting unit that converts electric charge transferred from the photoelectric conversion element into a pixel signal, a source follower circuit that amplifies the pixel signal, a monitoring circuit that monitors a voltage of the source follower circuit, a comparator that outputs a result of comparison between the pixel signal input via the source follower circuit, and a ramp signal, and a correcting circuit that corrects the ramp signal on the basis of an output of the monitoring circuit.

11 Claims, 11 Drawing Sheets

IMAGING DEVICE

CROSS REFERENCE TO RELATED APPLICATIONS

This application is a U.S. National Phase of International Patent Application No. PCT/JP2021/045530 filed on Dec. 10, 2021, which claims priority benefit of Japanese Patent Application No. JP 2021-003522 filed in the Japan Patent Office on Jan. 13, 2021. Each of the above-referenced applications is hereby incorporated herein by reference in its entirety.

TECHNICAL FIELD

The present disclosure relates to an imaging device.

BACKGROUND ART

In an imaging device, electric charge accumulated in a photoelectric conversion element is temporarily held in a floating diffusion (FD). Meanwhile, a pixel signal at a level corresponding to the amount of the electric charge held in the FD is input to a comparator. In the comparator, the pixel signal is compared with a ramp signal, and the comparison result is output.

CITATION LIST

Patent Document

Patent Document 1: Japanese Patent Application Laid-Open No. 2016-92661

SUMMARY OF THE INVENTION

Problems to be Solved by the Invention

In the imaging device as described above, there are cases where the voltage of the FD fluctuates during a reset (auto-zero) period of the comparator, for example. When the fluctuation of the voltage of the FD is large, the amount of fluctuation of the saturation charge amount (Qs) is also large. As a result, imaging performance might become unstable.

The present disclosure provides an imaging device capable of stabilizing its imaging performance.

Solutions to Problems

An imaging device according to an embodiment of the present disclosure includes: a photoelectric conversion element; a signal converting unit that converts electric charge transferred from the photoelectric conversion element into a pixel signal; a source follower circuit that amplifies the pixel signal; a monitoring circuit that monitors a voltage of the source follower circuit; a comparator that outputs a result of comparison between the pixel signal input via the source follower circuit, and a ramp signal; and a correcting circuit that corrects the ramp signal on the basis of an output of the monitoring circuit.

The source follower circuit may include a first transistor and a second transistor connected in series to the first transistor,
a gate of the first transistor may be connected to the signal converting unit, and
a source of the first transistor and a drain of the second transistor may be connected to a non-inverting input terminal of the comparator.

The monitoring circuit may include a third transistor and a fourth transistor connected in series to the third transistor,
a gate and a drain of the third transistor may be connected to a power supply line, and
a source of the third transistor and a drain of the fourth transistor may be connected to the correcting circuit.

The third transistor may be equal in size to the first transistor, and
the fourth transistor may be equal in size to the second transistor.

A gate-source threshold voltage of the third transistor may be equal to a gate-source threshold voltage of the first transistor, and
a gate-source threshold voltage of the fourth transistor may be equal to a gate-source threshold voltage of the second transistor.

The correcting circuit may include:
an operational amplifier that is connected to the source of the third transistor and the drain of the fourth transistor; and
a current adjustment element that adjusts a current in accordance with a voltage level of an output terminal of the operational amplifier.

The current adjustment element may be a P-channel MOSFET, and the output terminal of the operational amplifier may be connected to a gate of the P-channel MOSFET.

The correcting circuit may include:
an AD converter that converts an output value of the monitoring circuit into a digital value; and
a memory that temporarily stores the digital value.

The photoelectric conversion element, the signal converting unit, the source follower circuit, the monitoring circuit, and part of the comparator may be disposed on a first semiconductor substrate, and
a portion of the comparator excluding the part of the comparator, and the correcting circuit may be disposed on a second semiconductor substrate stacked on the first semiconductor substrate.

The comparator may include:
a differential transistor pair to which both the pixel signal and the ramp signal are input;
a current source transistor that is connected in series to the differential transistor pair; and
a current mirror circuit that is connected in series to the differential transistor pair, and
the differential transistor pair and the current source transistor may be disposed on the first semiconductor substrate, and the current mirror circuit may be disposed on the second semiconductor substrate.

A plurality of the photoelectric conversion elements may be two-dimensionally arranged, and
a plurality of the comparators as many as the plurality of the photoelectric conversion elements may be provided.

The imaging device may further include a RAMP generating circuit that generates the ramp signal on the basis of a result of correction performed by the correcting circuit.

MODE FOR CARRYING OUT THE INVENTION

First Embodiment

Figure 1:
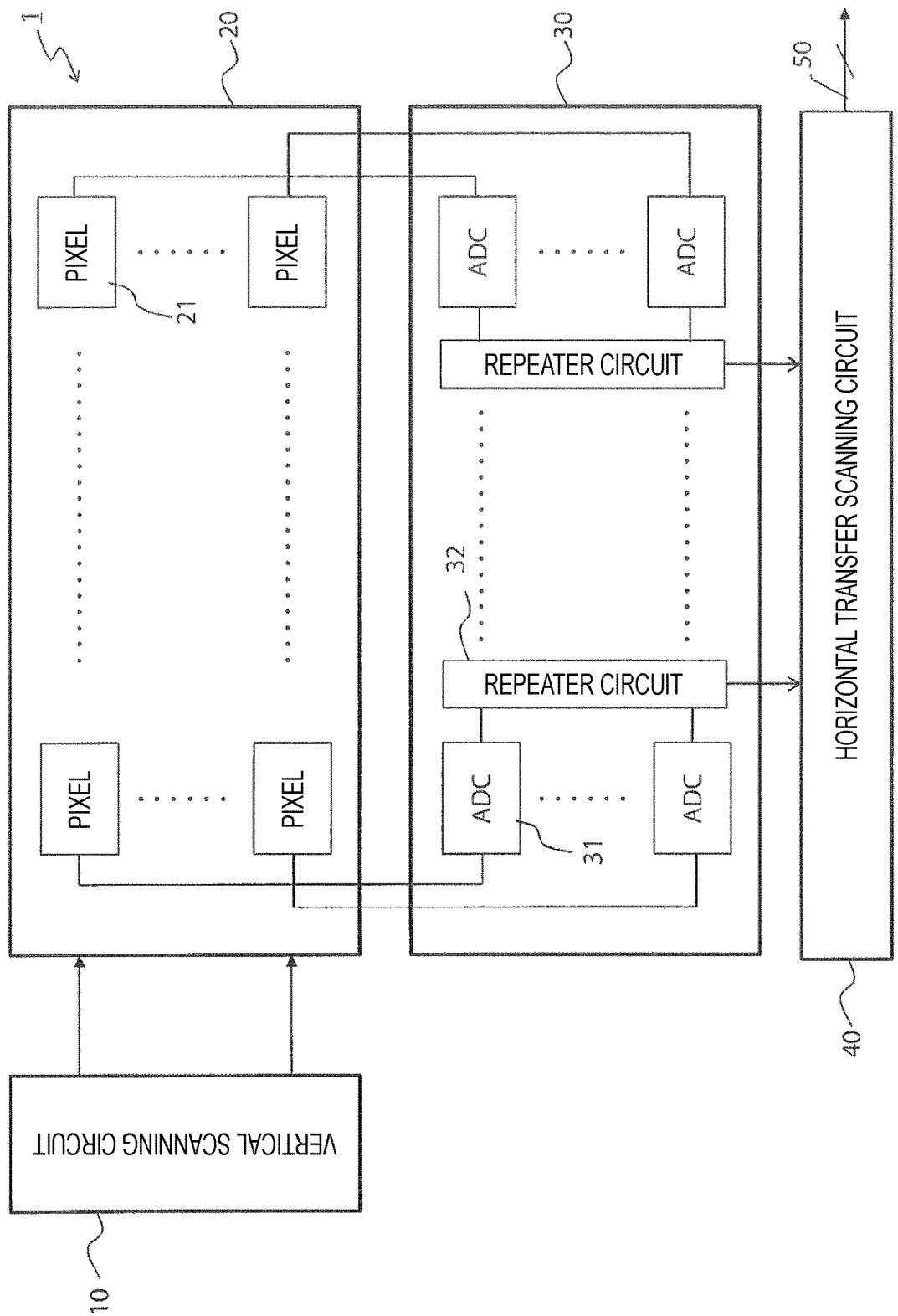
FIG. 1 is a diagram showing a schematic configuration of an imaging device according to a first embodiment.

FIG. 1 is a diagram showing a schematic configuration of an imaging device according to a first embodiment. An imaging device 1 shown in FIG. 1 includes a vertical scanning circuit 10, a pixel array 20, a signal processing circuit 30, and a horizontal transfer scanning circuit 40.

The vertical scanning circuit 10 is formed with a shift register, for example, and transmits a drive signal to the pixel array 20. In the pixel array 20, a plurality of pixels 21 is arrayed two-dimensionally (in a matrix). The plurality of pixels 21 is vertically scanned by the vertical scanning circuit 10. In other words, the plurality of pixels 21 is driven on the basis of the drive signal that is input for each row from the vertical scanning circuit 10. The imaging device 1 functions as an image sensor of a global shutter type in which all the pixels 21 accumulate (expose) electric charge at the same timing, or of a rolling shutter type in which the plurality of pixels 21 accumulates electric charge at different timings.

The signal processing circuit 30 processes signals output from the pixel array 20. In this embodiment, the signal processing circuit 30 is a pixel analog-to-digital converter (ADC) that includes one ADC 31 for each one pixel 21. In the signal processing circuit 30, the ADCs 31 are two-dimensionally arranged in a manner similar to that for the pixels 21. The signal processing circuit 30 also includes repeater circuits 32 in addition to the ADCs 31.

The repeater circuits 32 are provided for the respective columns of the ADCs 31. That is, the number of columns of the repeater circuits 32 is the same as the number of columns of the ADCs 31. The repeater circuits 32 transfer time codes generated by time code generating units (not shown) to the ADCs 31, and transfer digital signals subjected to digital conversion by the ADCs 31 to the horizontal transfer scanning circuit 40.

The horizontal transfer scanning circuit 40 is formed with a shift register, for example, and performs horizontal scanning. Specifically, the horizontal transfer scanning circuit 40 sends the digital signals transferred from the respective repeater circuits 32 to a signal line 50.

Figure 2:
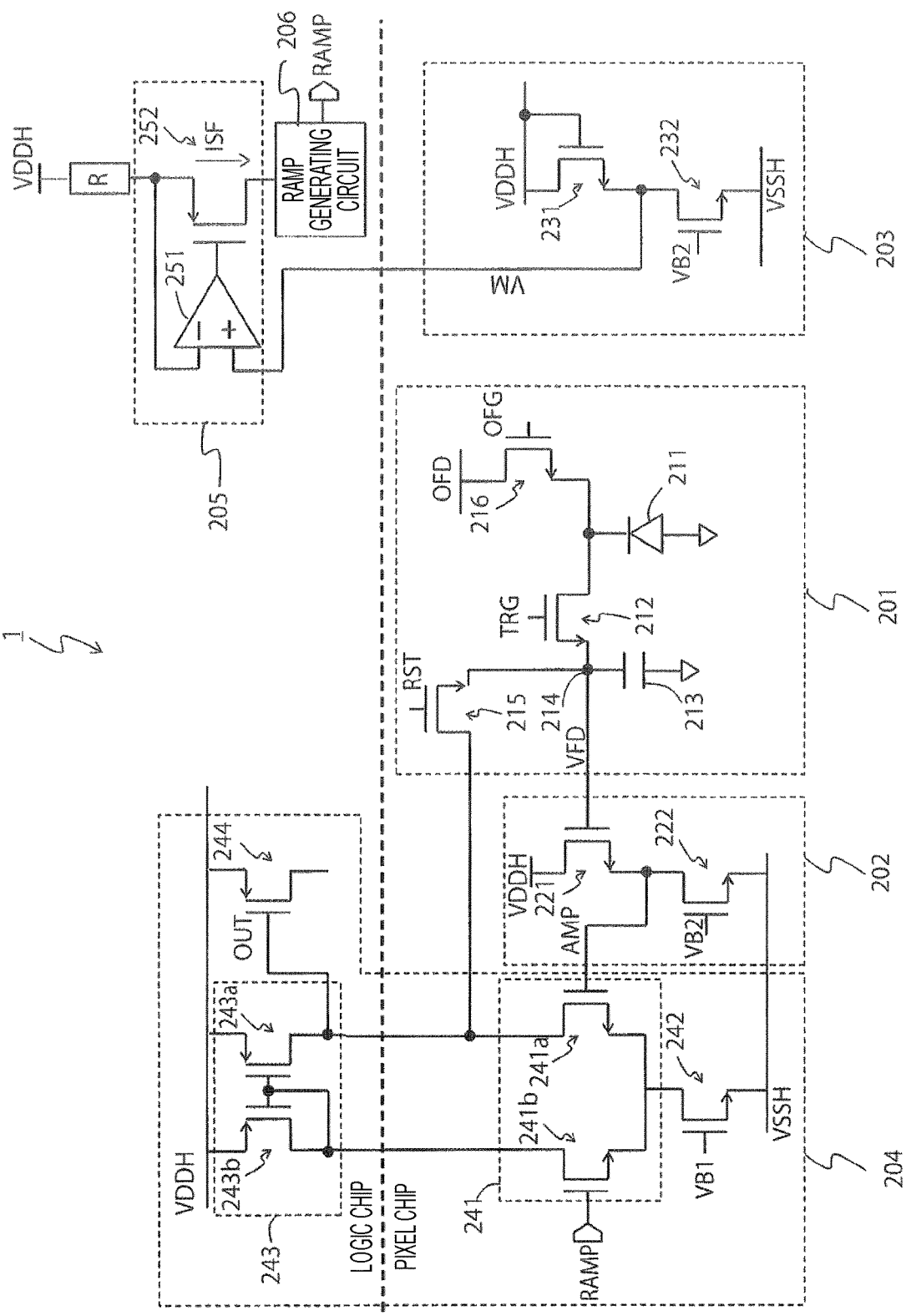
FIG. 2 is a diagram showing the circuit configuration of the relevant components of the imaging device according to the first embodiment.

FIG. 2 is a diagram showing the circuit configuration of the relevant components of the imaging device 1 according to the first embodiment. As shown in FIG. 2, the imaging device 1 includes a pixel circuit 201, a source follower (SF) circuit 202, a monitoring circuit 203, a comparator 204, a correcting circuit 205, and a RAMP generating circuit 206. In this embodiment, the pixel circuit 201, the SF circuit 202, and the monitoring circuit 203 are included in the pixels 21. On the other hand, the comparator 204, the correcting circuit 205, and the RAMP generating circuit 206 are included in the ADCs 31. In the description below, each unit is explained.

The pixel circuit 201 includes a photodiode 211, a transfer transistor 212, an FD 213, a node 214, a reset transistor 215, and a discharge transistor 216.

The photodiode 211 is an example of a photoelectric conversion element that converts incident light into electric charge by photoelectric conversion, and accumulates the electric charge. The anode of the photodiode 211 is grounded, and the cathode is connected to the transfer transistor 212 and the discharge transistor 216.

The transfer transistor 212 is formed with an N-channel metal oxide semiconductor field effect transistor (MOSFET), for example. A transfer signal TRG is input from the vertical scanning circuit 10 to the gate of the transfer transistor 212. The transfer transistor 212 is driven on the basis of the transfer signal TRG. When the transfer transistor 212 is put into an on-state, the electric charge accumulated in the photodiode 211 is transferred to the FD 213.

The FD 213 is a floating diffusion region having a predetermined storage capacity. The FD 213 temporarily stores the electric charge transferred from the photodiode 211.

The node 214 is a connecting point between one end of the FD 213 and the SF circuit 202. A pixel signal indicating the level corresponding to the amount of the electric charge accumulated in the FD 213, which is the level of the voltage VFD of the node 214, is transferred to the SF circuit 202 via the node 214. The FD 213 and the node 214 function as a signal converting unit that converts the electric charge accumulated in the photodiode 211 into a pixel signal of the level corresponding to the charge amount.

The reset transistor 215 is formed with an N-channel MOSFET, for example. A reset signal RST is input from the vertical scanning circuit 10 to the gate of the reset transistor 215. The reset transistor 215 is driven on the basis of the reset signal RST. When the reset transistor 215 is put into an on-state, the electric charge accumulated in the node 214 is released, and the potential of the node 214 is reset. When the resetting is completed, the reset transistor 215 is switched from the on-state to an off-state.

The discharge transistor 216 is formed with an N-channel MOSFET, for example. The discharge transistor 216 is disposed in series between the photodiode 211 and an overflow drain OFD. Also, a discharge signal OFG is input from the vertical scanning circuit 10 to the gate of the discharge transistor 216. The discharge transistor 216 is driven on the basis of the discharge signal OFG. When the discharge transistor 216 is put into an on-state, the electric charge accumulated in the photodiode 211 is released.

Next, the SF circuit 202 is described. The SF circuit 202 includes an amplification transistor 221 (a first transistor) and an amplification transistor 222 (a second transistor) connected in series to the transistor 221.

The amplification transistor 221 is formed with an N-channel MOSFET that has a gate connected to the node 214, a drain connected to a power supply line VDDH, and a source connected to the drain of the amplification transistor 222, for example. The amplification transistor 221 amplifies a pixel signal input from the node 214, and outputs the amplified pixel signal to the comparator 204.

Like the amplification transistor 221, the amplification transistor 222 is formed with an N-channel MOSFET. A control signal VB2 is input from the vertical scanning circuit 10 to the gate of the amplification transistor 222. The source is connected to a grounding line VSSH. The amplification transistor 222 is always maintained in an on-state by the control signal VB2.

Next, the monitoring circuit 203 is described. The monitoring circuit 203 includes an amplification transistor 231 (a third transistor) and an amplification transistor 232 (a fourth transistor) connected in series to the transistor 231.

Like the amplification transistor 221, the amplification transistor 231 is formed with an N-channel MOSFET. The gate and the drain of the amplification transistor 231 are connected to the power supply line VDDH, and the source is connected to the drain of the amplification transistor 232.

Like the amplification transistor 231, the amplification transistor 232 is formed with an N-channel MOSFET. The control signal VB2 is input to the gate of the amplification transistor 232, as in the amplification transistor 222. The source is connected to the grounding line VSSH.

The monitoring circuit 203 is a dummy circuit of the SF circuit 202. Therefore, the amplification transistor 231 is formed to have the same size in the same manufacturing process as that for the amplification transistor 221, and the amplification transistor 232 is also formed to have the same size in the same manufacturing process as that for the amplification transistor 222.

Next, the comparator 204 is described. The comparator 204 compares an amplified signal AMP obtained by amplifying a pixel signal in the SF circuit 202 with a triangular-wave ramp signal RAMP generated in the RAMP generating circuit 206, and outputs a comparison result to the repeater circuit 32. The comparator 204 includes a differential transistor pair 241, a current source transistor 242, a current mirror circuit 243, and a transistor 244.

The differential transistor pair 241 includes a pair of differential transistors 241a and 241b that are formed with N-channel MOSFETs. The current mirror circuit 243 includes a pair of transistors 243a and 243b that are formed with P-channel MOSFETs. The current source transistor 242 is formed with an N-channel MOSFET, and the transistor 244 is formed with a P-channel MOSFET.

The gate of the differential transistor 241a corresponds to a non-inverting input terminal (+) to which the above amplified signal AMP is input. Meanwhile, the gate of the differential transistor 241b corresponds to an inverting input terminal (−) to which the ramp signal RAMP is input. The sources of the respective differential transistors are both connected to the drain of the current source transistor 242.

The drain of the differential transistor 241a is connected to the source of the transistor 243a and the gate of the transistor 244. The gate of the transistor 244 corresponds to the output terminal of the comparator 204. The drain of the differential transistor 241b is connected to the source and the gate of the transistor 243b.

A control signal VB1 is input from the vertical scanning circuit 10 to the gate of the current source transistor 242. Further, the source of the current source transistor 242 is connected to the grounding line VSSH. The current source transistor 242 supplies a current corresponding to the voltage level of the control signal VB1.

The sources of the transistors 243a and 243b constituting the current mirror circuit 243 are connected to the power supply line VDDH.

Next, the correcting circuit 205 is described. The correcting circuit 205 includes an operational amplifier 251 and a current adjustment element 252. The non-inverting input terminal (+) of the operational amplifier 251 is connected to the source of the amplification transistor 231 and the drain of the amplification transistor 232 of the monitoring circuit 203. The inverting input terminal (−) is connected to the power supply line VDDH via a resistance element R.

In this embodiment, the current adjustment element 252 is formed with a P-channel MOSFET. The gate of the current adjustment element 252 is connected to the output terminal of the operational amplifier 251. The drain is connected to the inverting input terminal (−) of the operational amplifier 251 and the resistance element R. The source is connected to the RAMP generating circuit 206. The current adjustment element 252 supplies the RAMP generating circuit 206 a current ISF corresponding to the voltage level of the output terminal of the operational amplifier 251.

The RAMP generating circuit 206 includes a digital-to-analog converter (DAC). As this DAC performs a process of converting a digital signal into an analog signal, a ramp signal RAMP in the form of triangular waves is generated. At this point of time, the voltage of the ramp signal RAMP can be adjusted on the basis of the above current ISF. The generated ramp signal RAMP is input to the gate of the differential transistor 241b of the comparator 204.

Figure 3:
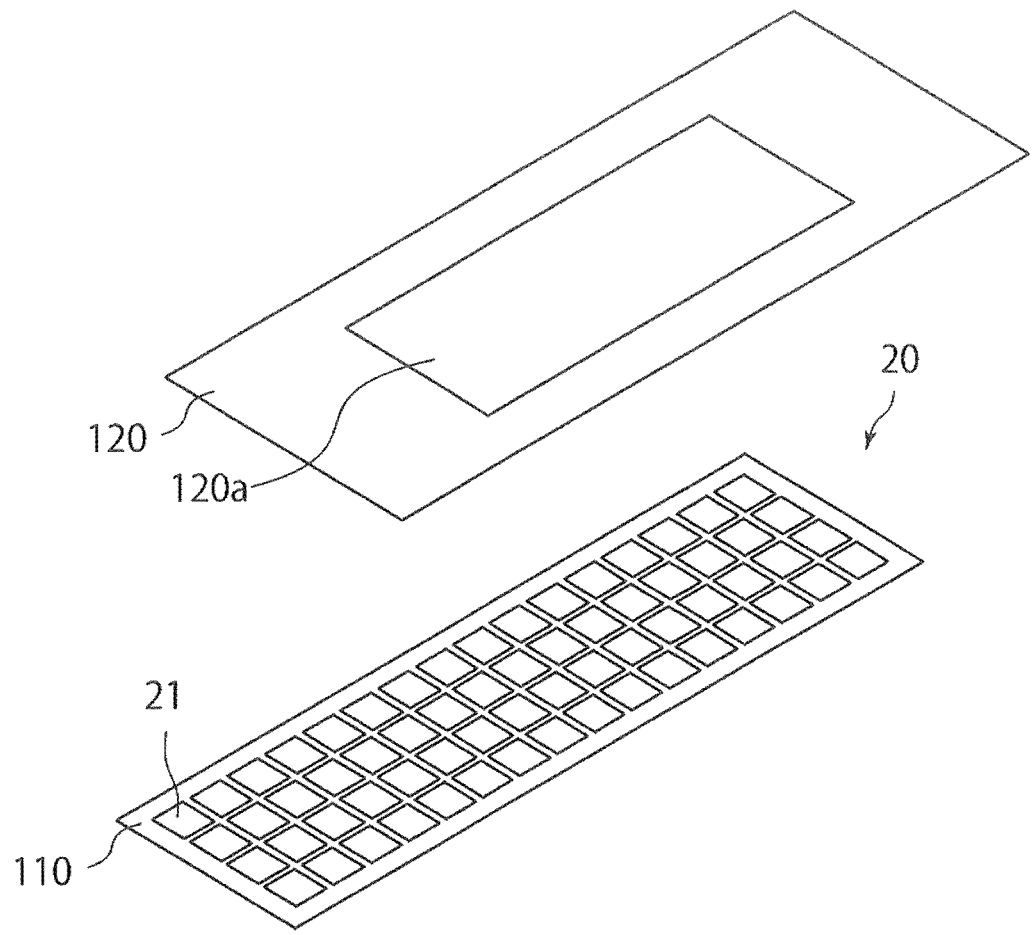
FIG. 3 is a layout diagram showing an example of the positional relationship between a pixel array and an ADC.

FIG. 3 is a layout diagram showing an example of the positional relationship between the pixel array 20 and the ADC 31. In this embodiment, the pixel array 20 is formed on a first semiconductor substrate (a pixel chip) 110, as shown in FIG. 3. On the first semiconductor substrate 110, the plurality of pixels 21 is two-dimensionally arranged. In each pixel 21, the pixel circuit 201, the SF circuit 202, and the monitoring circuit 203 described above are formed. Further, part of the ADC 31, which is the differential transistor pair 241 and the current source transistor 242, is formed on the first semiconductor substrate 110, as shown in FIG. 2.

A second semiconductor substrate (a logic chip) 120 is stacked on the first semiconductor substrate 110. The second semiconductor substrate 120 has a region 120a facing the pixel array 20. In this region 120a, a portion excluding part of the ADC 31, which is the current mirror circuit 243 and the transistor 244, is formed.

Further, the correcting circuit 205 and the RAMP generating circuit 206 are also formed on the second semiconductor substrate 120. The first semiconductor substrate 110 and the second semiconductor substrate 120 are bonded to each other with copper pads, bumps, or through silicon vias (TSVs), for example. By adopting a two-layer structure in which the pixel array 20 and the ADC 31 are disposed on different semiconductor substrates as in this embodiment, it is possible to secure a sufficiently large light receiving area of the photodiode 211.

Figure 4:
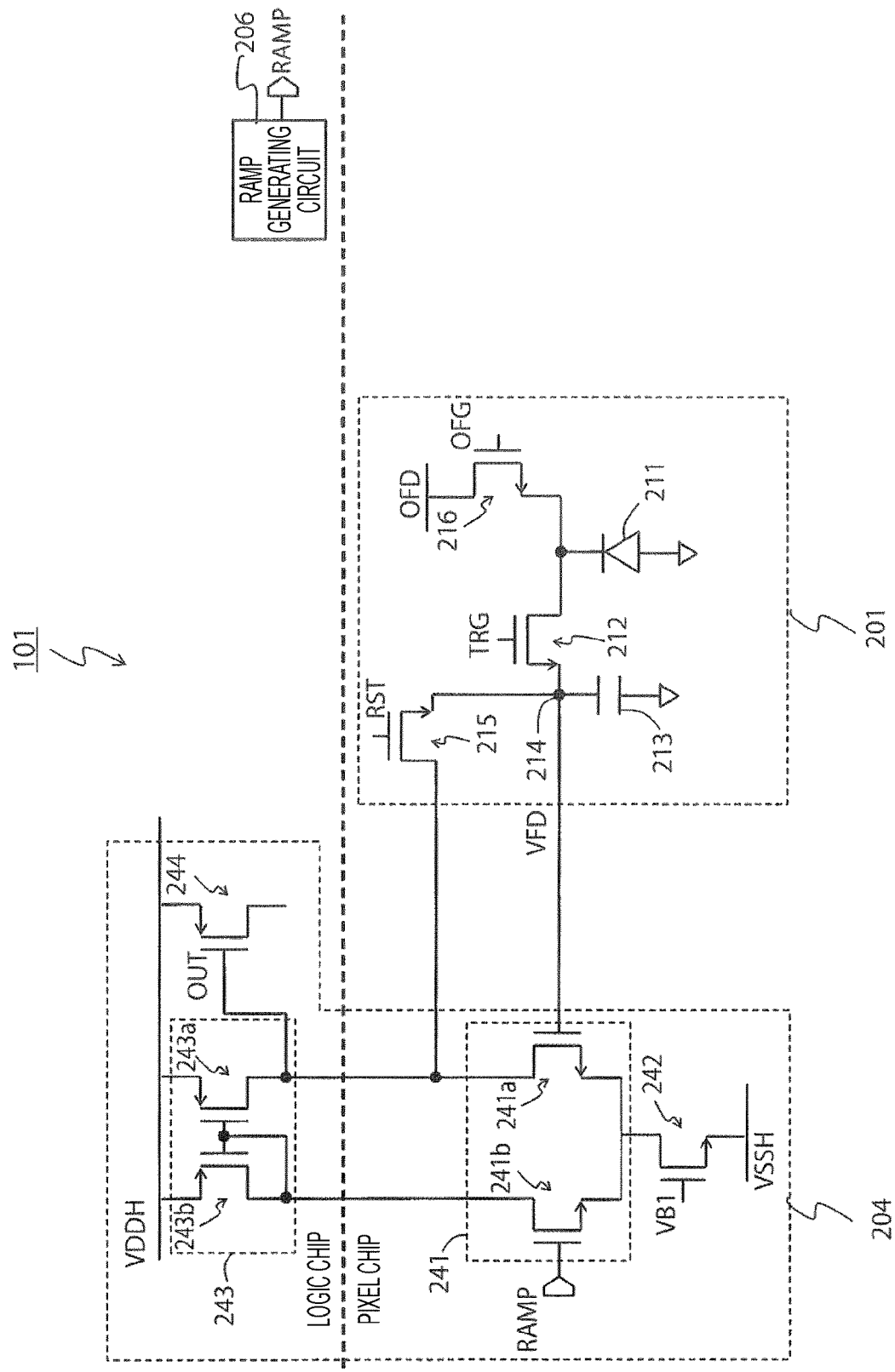
FIG. 4 is a diagram showing the circuit configuration of an imaging device according to a first comparative example.
Figure 5:
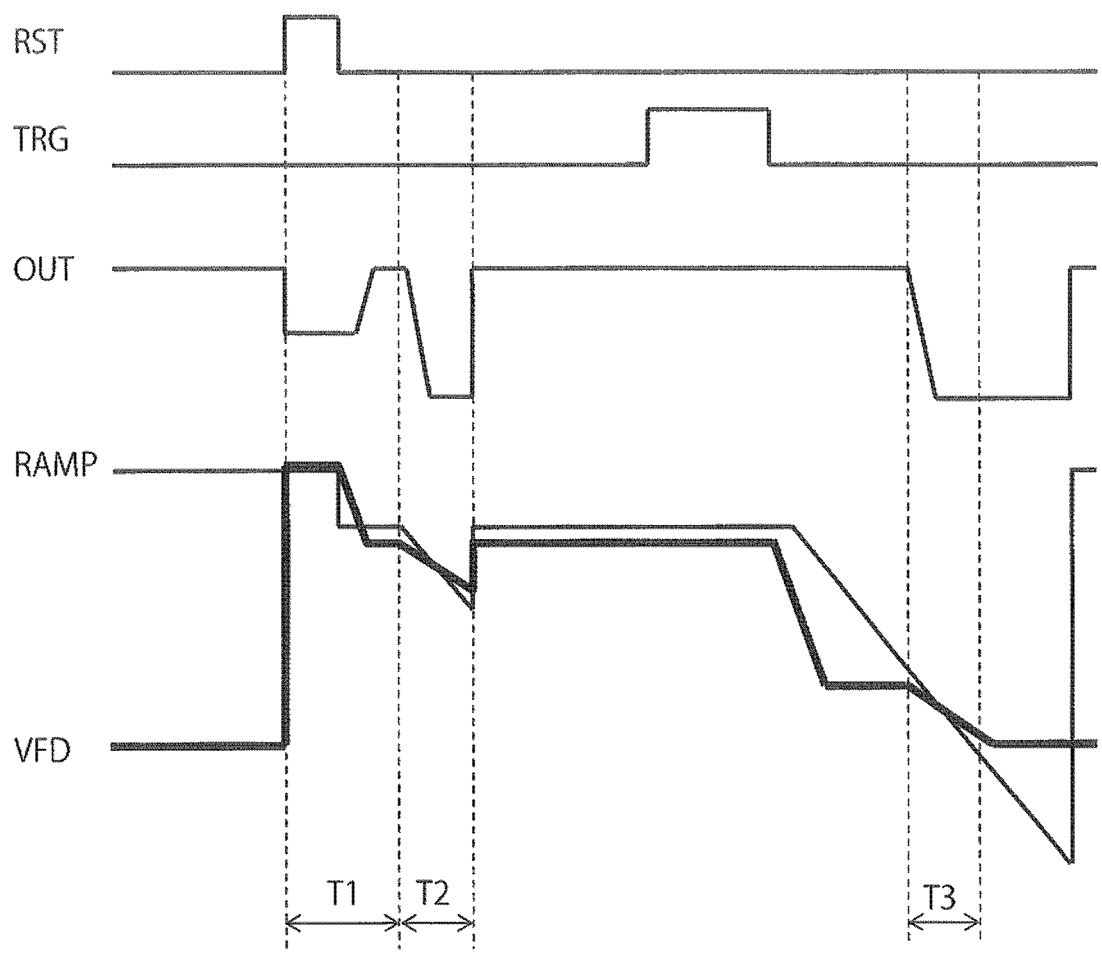
FIG. 5 is a timing chart of the imaging device according to the first comparative example 1.

FIG. 4 is a diagram showing the circuit configuration of an imaging device according to a first comparative example. Further, FIG. 5 is a timing chart of the imaging device according to the first comparative example 1. In this modification, components similar to those of the first embodiment are denoted by the same reference numerals, and detailed explanation thereof is not made herein.

As shown in FIG. 4, an imaging device 101 according to this comparative example does not include the SF circuit 202, the monitoring circuit 203, and the correcting circuit 205. Therefore, when the voltage of the output terminal OUT of the comparator 204 drops during a pre-charge (P) phase period T2 after the reset (auto-zero) period T1, the voltage VFD of the node 214 is affected by the coupling between the gate and the drain of the differential transistor 241a. As a result, as shown in FIG. 5, the voltage VFD of the node 214 drops. Further, in the data (D) phase period T3, the voltage VFD of the node 214 drops as the voltage of the output terminal OUT of the comparator 204 drops, as shown in FIG. 5. The decrease in the voltage VFD can lead to an increase in the time of analog-to-digital conversion.

Figure 6:
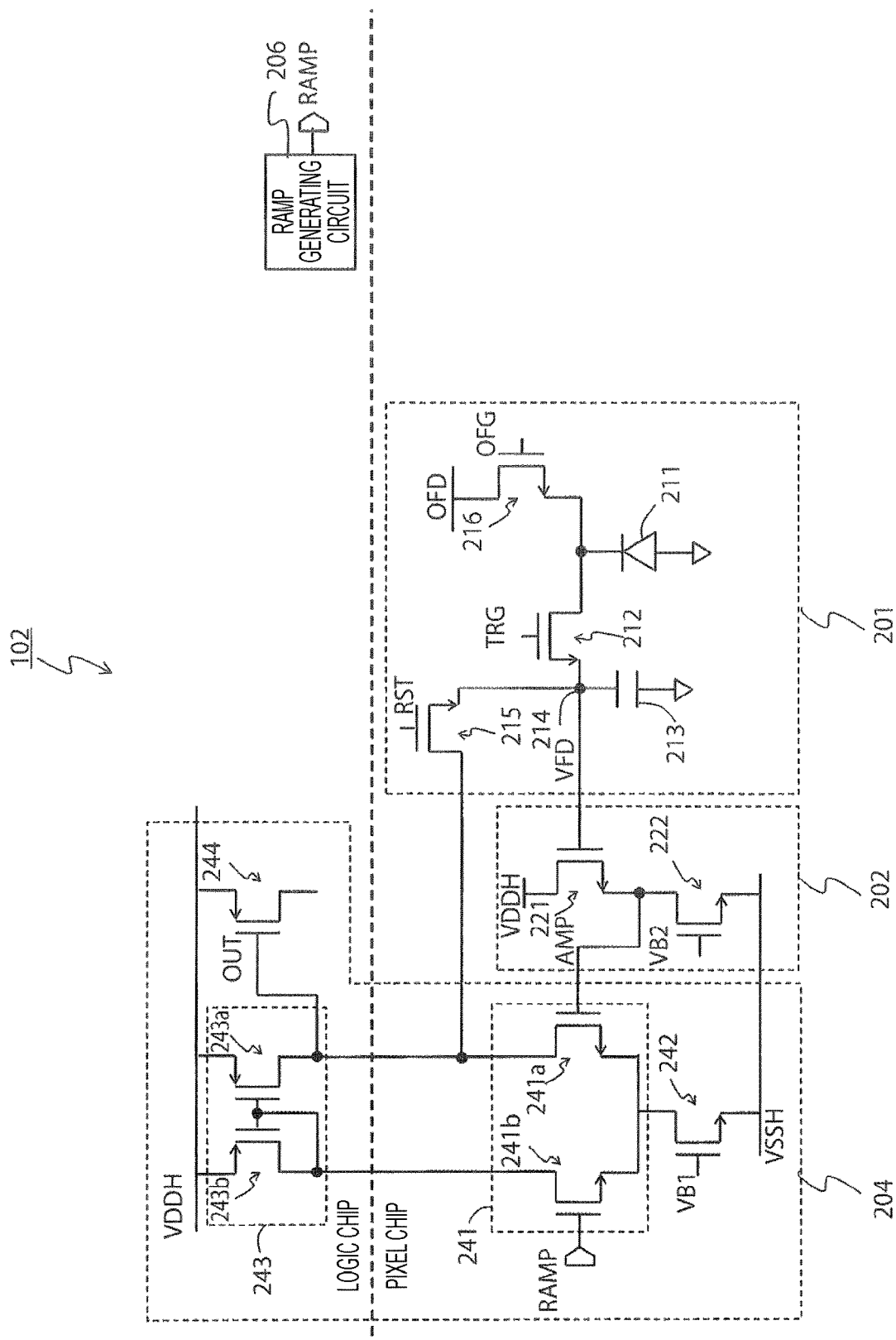
FIG. 6 is a diagram showing the circuit configuration of an imaging device according to a second comparative example.
Figure 7:
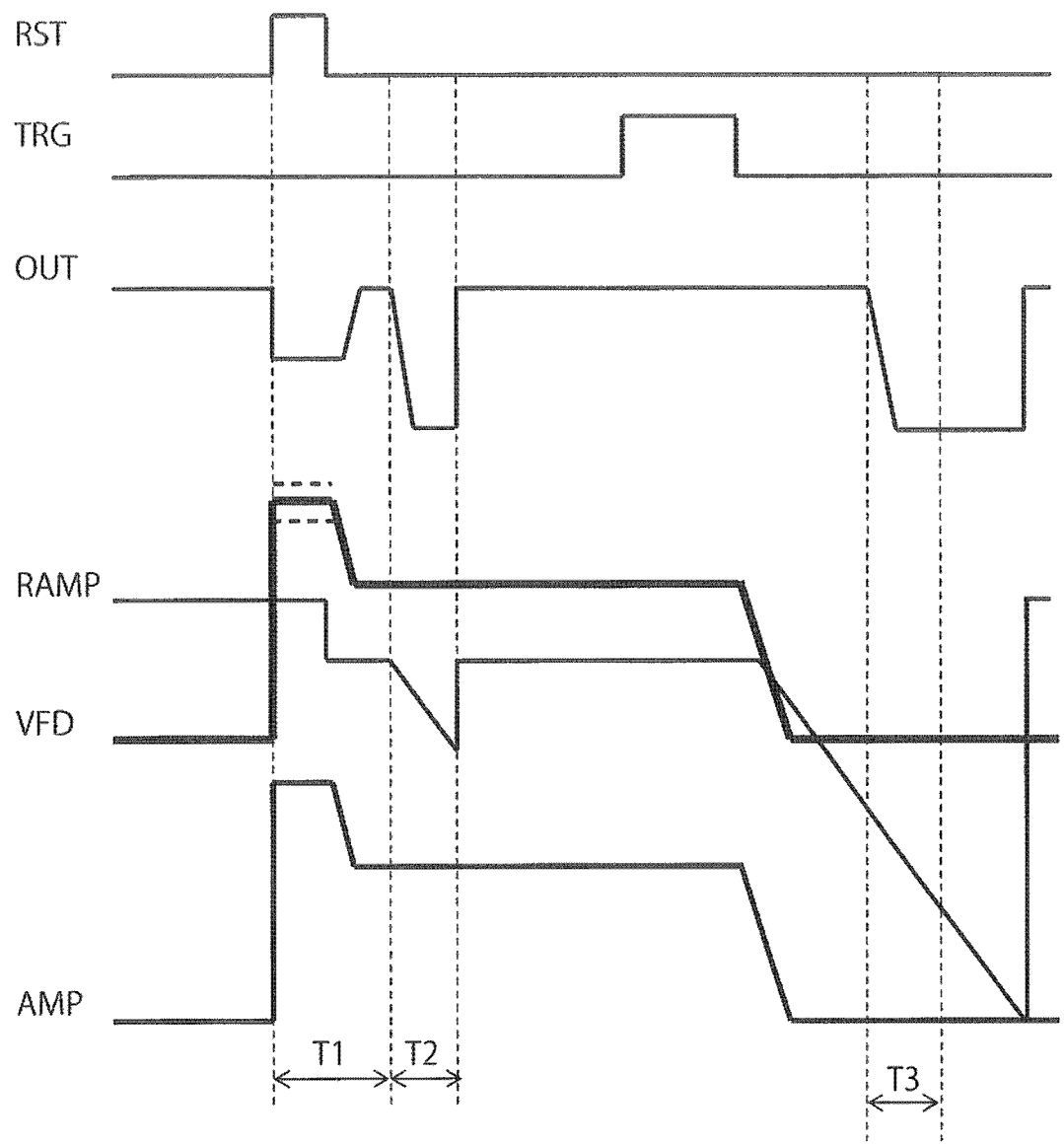
FIG. 7 is a timing chart of the imaging device according to the second comparative example.

FIG. 6 is a diagram showing the circuit configuration of an imaging device according to a second comparative example. Further, FIG. 7 is a timing chart of the imaging device according to the second comparative example. In this modification, components similar to those of the first embodiment are also denoted by the same reference numerals, and detailed explanation thereof is not made herein.

As shown in FIG. 6, an imaging device 102 according to this comparative example includes the SF circuit 202, but does not include the monitoring circuit 203 and the correcting circuit 205. In the imaging device 102, the SF circuit 202 is disposed between the pixel circuit 201 and the comparator 204, and accordingly, the voltage VFD of the node 214 is not affected by the coupling between the gate and the drain of the differential transistor 241a. As a result, the decrease in the voltage VFD in the P phase period T2 and the D phase period T3 is reduced as shown in FIG. 7.

However, since the potential of the ramp signal RAMP and the potential of the amplified signal AMP become equal in a reset period T1, the voltage VFD becomes higher than the voltage of the ramp signal RAMP by the amount equivalent to the threshold voltage VSF between the gate and the source of the amplification transistor 221. In this case, when the process of manufacturing the amplification transistor 221, the threshold voltage between the gate and the source, the temperature, and the like vary, the voltage VFD fluctuates during the reset period T1, as shown in FIG. 7. When the fluctuation of the voltage VFD is large, the fluctuation of the saturation charge amount (Qs) is also large. In this case, there is a possibility that imaging performance might become unstable.

In view of this, the imaging device 1 according to this embodiment includes the monitoring circuit 203 and the correcting circuit 205, to prevent the fluctuation of the voltage VFD in the reset period T1. In the description below, an operation of the imaging device 1 according to this embodiment is described with reference to FIG. 8.

Figure 8:
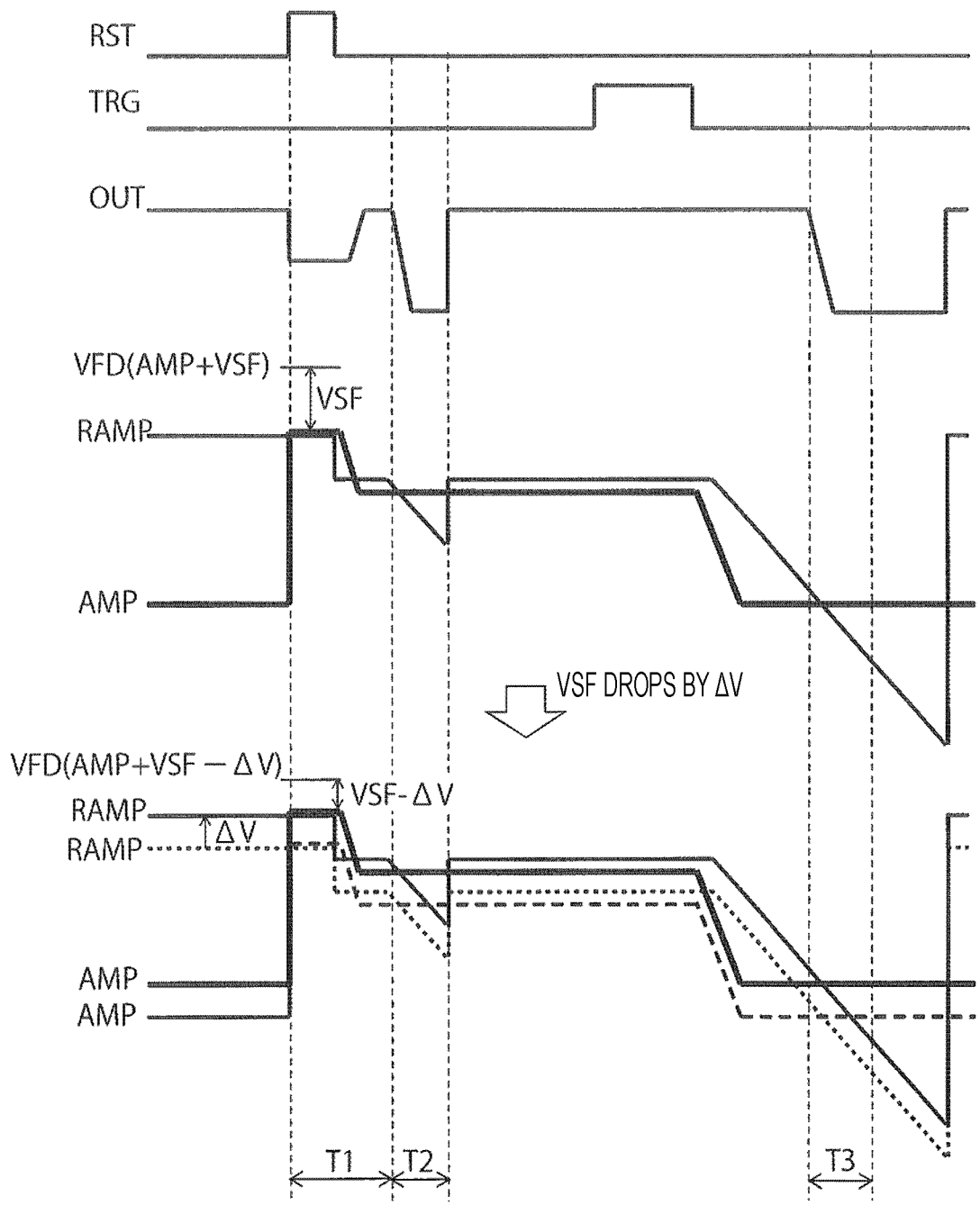
FIG. 8 is a timing chart of the imaging device according to the first embodiment.

FIG. 8 is a timing chart of the imaging device 1 according to this embodiment. As shown in FIG. 8, during the reset period T1, a high-level reset signal RST is input to the gate of the reset transistor 215, so that the reset transistor 215 is put into an on-state. As a result, the comparator 204 is reset, and accordingly, the potential of the ramp signal RAMP becomes equal to the potential of the amplified signal AMP. Thus, the voltage VFD of the node 214 has a value obtained by adding the gate-source threshold voltage VSF of the amplification transistor 221 to the voltage of the amplified signal AMP.

Further, in the monitoring circuit 203, the amplification transistor 231 has the same size as the amplification transistor 221. Accordingly, the gate-source threshold voltage of the amplification transistor 231 is equal to the gate-source threshold voltage VSF of the amplification transistor 221. Thus, the voltage of an amplified signal VM can be expressed as shown below in Expression (1).

$$VM = VDDH - VSF \quad (1)$$

The amplified signal VM is a signal that is input from the source of the amplification transistor 231 to the non-inverting input terminal (+) of the operational amplifier 251 of the correcting circuit 205, and corresponds to the amplified signal AMP. VDDH represents the power supply voltage.

Meanwhile, the current ISF for adjusting the voltage of the ramp signal RAMP can be expressed as shown below in Expression (2) using the above Expression (1).

$$ISF = (VDDH - VM)/R = VSF/R \quad (2)$$

According to Equation (2) shown above, when the current ISF is input to the RAMP generating circuit 206, the RAMP generating circuit 206 generates the ramp signal RAMP in which the voltage is lowered by the amount equivalent to the threshold voltage VSF. For example, in a case where the gate-source threshold voltage VSF of the amplification transistor 231 (the amplification transistor 221) drops by $\Delta V$, the current ISF is adjusted by the correcting circuit 205, so that the voltage of the ramp signal RAMP rises by $\Delta V$. Thus, the fluctuation of the voltage VFD is prevented.

During the P phase period T2 after the reset period T1, the SF circuit 202 prevents the voltage VFD of the node 214 from being affected by the coupling between the gate and the drain of the differential transistor 241a. Thus, the decrease in the voltage VFD is also reduced during the P phase period T2.

After that, when a high-level transfer signal TRG is input to the gate of the transfer transistor 212, the transfer transistor 212 is put into an on-state. As a result, the electric charge accumulated in the photodiode 211 is transferred to the FD 213.

After that, during the D phase period T3, the SF circuit 202 also prevents the voltage VFD of the node 214 from being affected by the coupling between the gate and the drain of the differential transistor 241a. Thus, the decrease in the voltage VFD is also reduced during the D phase period T3.

According to this embodiment described so far, the monitoring circuit 203 monitors the threshold voltage VSF between the gate and the source of the amplification transistor 221 in the SF circuit 202 in a pseudo manner. When the threshold voltage VSF fluctuates, the correcting circuit 205 adjusts the current ISF in accordance with the voltage fluctuation.

Further, the RAMP generating circuit 206 generates the ramp signal RAMP in which the voltage fluctuation is offset in accordance with the current ISF. As a result, the fluctuation of the voltage VFD during the reset period T1 is prevented, and the fluctuation of the saturation charge amount (Qs) is also prevented. Thus, imaging performance can be stabilized.

Second Embodiment

Figure 9:
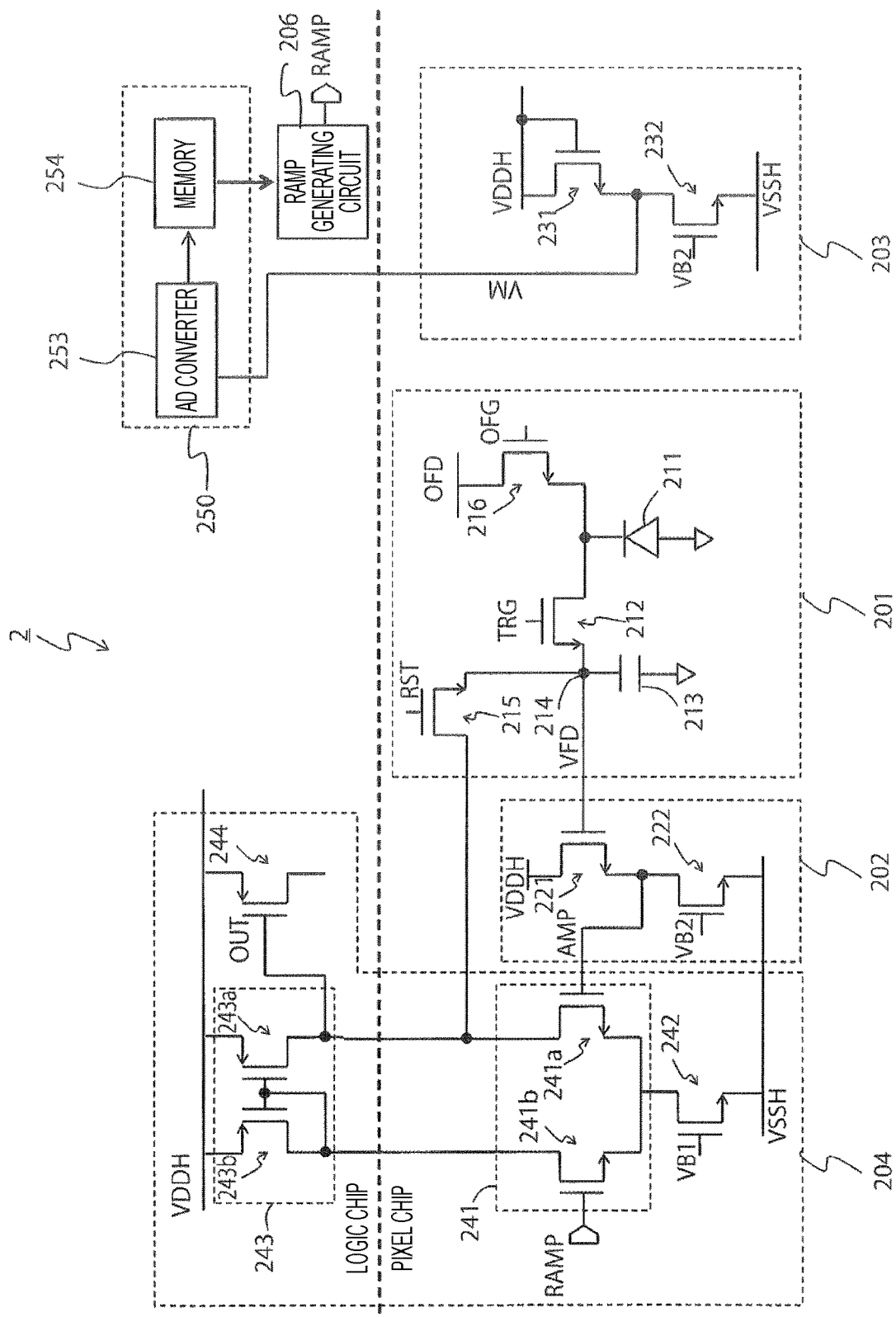
FIG. 9 is a circuit diagram of an imaging device according to a second embodiment.

FIG. 9 is a diagram showing the circuit configuration of the relevant components of an imaging device according to a second embodiment. Components similar to those of the first embodiment described above are denoted by the same reference numerals, and detailed explanation thereof is not made herein.

An imaging device 2 according to this embodiment differs from the imaging device 1 according to the first embodiment in including a correcting circuit 250 in place of the correcting circuit 205. The correcting circuit 250 includes an AD converter 253 and a memory 254.

The AD converter 253 digitally processes an amplified signal VM output from the monitoring circuit 203. As a result, the output value of the monitoring circuit 203 is converted into a digital value. The memory 254 temporarily stores this digital value. The RAMP generating circuit 206 adjusts the voltage of a ramp signal RAMP on the basis of the digital value stored in the memory 254.

In the first embodiment described above, the amplified signal VM indicating the result of pseudo monitoring of the voltage fluctuation in the SF circuit 202 is converted into the current ISF, to adjust the voltage of the ramp signal RAMP. Accordingly, the ramp signal is automatically calibrated.

In this embodiment, on the other hand, the amplified signal VM described above is converted into a digital signal, and is then stored into the memory 254. As signal processing is performed in this manner, it becomes possible to manually control the voltage of the ramp signal RAMP. In view of the above, according to this embodiment, the ramp signal RAMP can be more appropriately adjusted in accordance with the voltage fluctuation in the SF circuit 202, and thus, imaging performance can be improved.

<Example Applications to Mobile Structures>

The technology of the present disclosure (the present technology) can be applied to various products. For example, the technology according to the present disclosure may be embodied as a device mounted on any type of mobile structure such as an automobile, an electric vehicle, a hybrid electric vehicle, a motorcycle, a bicycle, a personal mobility, an airplane, a drone, a ship, or a robot.

Figure 10:
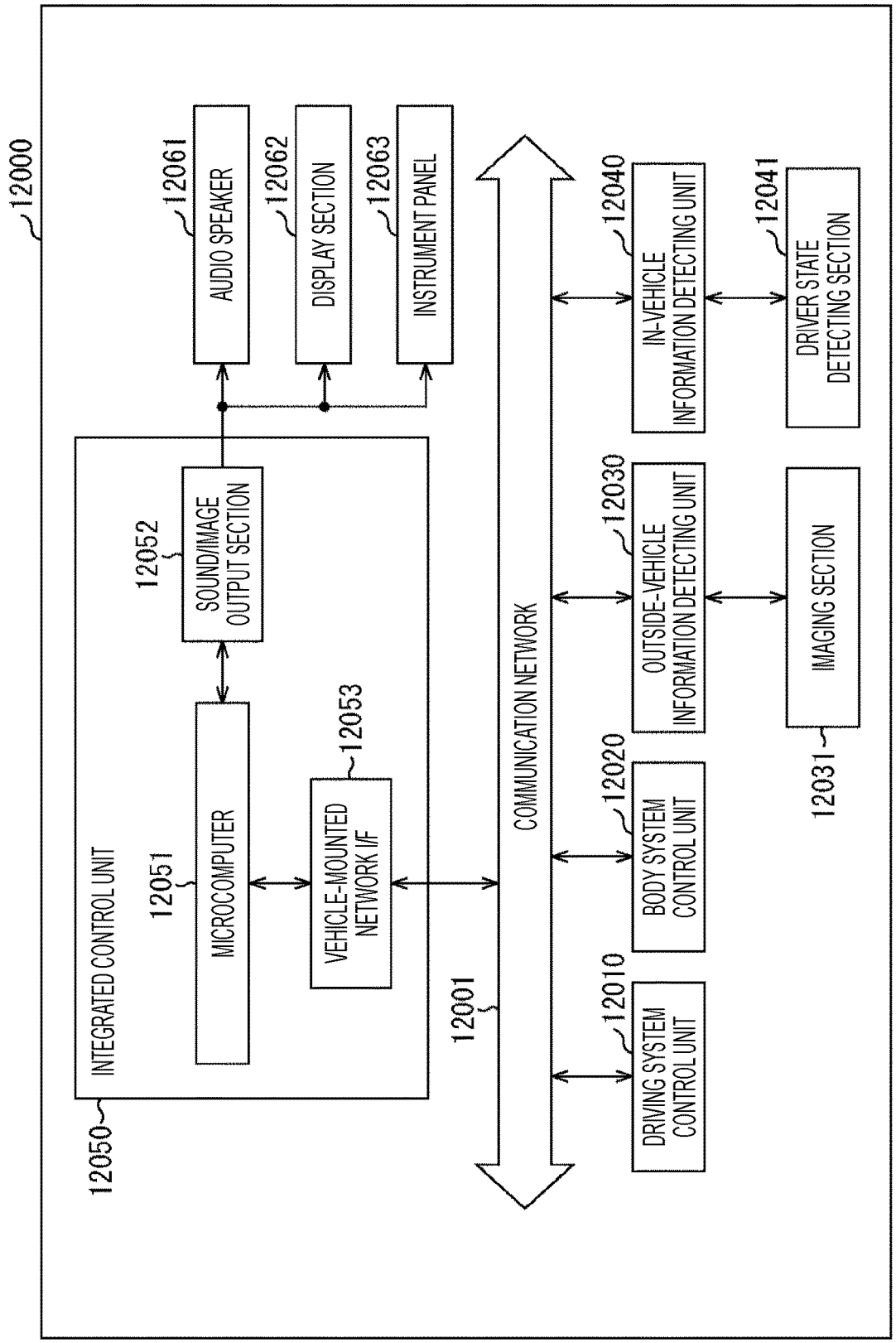
FIG. 10 is a block diagram showing an example schematic configuration of a vehicle control system.

FIG. 10 is a block diagram showing an example schematic configuration of a vehicle control system that is an example of a mobile structure control system to which the technology according to the present disclosure can be applied.

The vehicle control system 12000 includes a plurality of electronic control units connected to each other via a communication network 12001. In the example shown in FIG. 10, the vehicle control system 12000 includes a driving system control unit 12010, a body system control unit 12020, an outside-vehicle information detecting unit 12030, an in-vehicle information detecting unit 12040, and an integrated control unit 12050. Also, a microcomputer 12051, a sound/image output section 12052, and a vehicle-mounted network interface (I/F) 12053 are shown as functional components of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound or an image to an output device capable of visually or auditorily giving information to an occupant of the vehicle or the outside of the vehicle. In the example in FIG. 10, an audio speaker 12061, a display section 12062, and an instrument panel 12063 are shown as examples of output devices. For example, the display section 12062 may include at least one of an on-board display or a head-up display.

Figure 11:
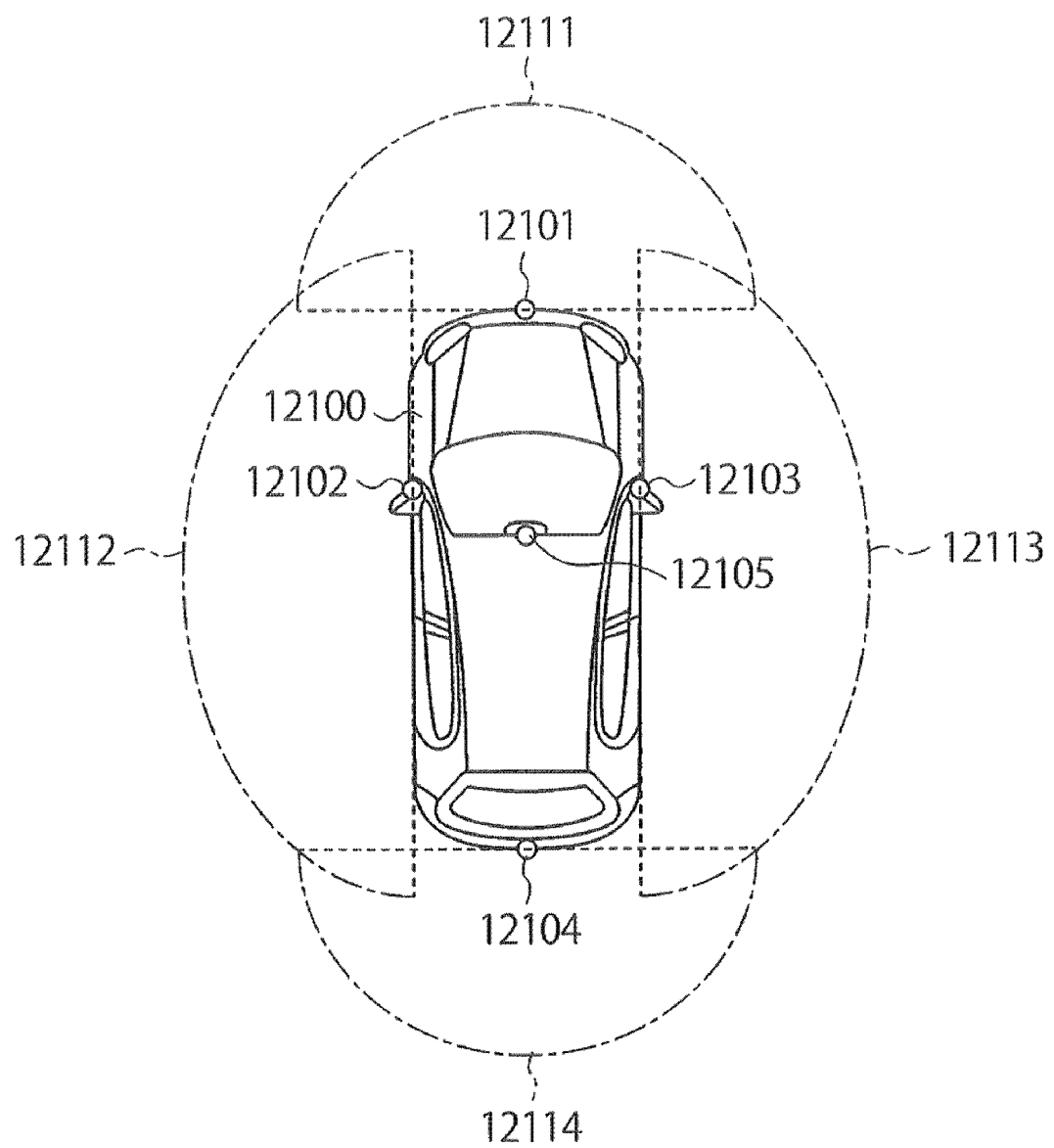
FIG. 11 is a diagram for explaining an example of the installation positions of an outside-vehicle information detecting section and imaging sections.

FIG. 11 is a diagram showing an example of the installation positions of imaging sections 12031.

In FIG. 11, the imaging sections 12031 includes imaging sections 12101, 12102, 12103, 12104, and 12105.

The imaging sections 12101, 12102, 12103, 12104, and 12105 are disposed at positions on a front nose, sideview mirrors, a rear bumper, and a back door of the vehicle 12100 as well as a position on an upper portion of a windshield within the interior of the vehicle, for example. The imaging section 12101 provided on the front nose and the imaging section 12105 provided on the upper portion of the windshield within the interior of the vehicle each obtain mainly images of the scenery in front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Note that FIG. 11 illustrates an example of imaging ranges of the imaging sections 12101 to 12104. An imaging range 12111 represents the imaging range of the imaging section 12101 provided to the front nose. Imaging ranges 1211212113 respectively represent the imaging ranges of the imaging sections 12102 and 12103 provided on the sideview mirrors. An imaging range 12114 represents the imaging range of the imaging section 12104 provided on the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology according to the present disclosure can be applied has been described above. The technology according to the present disclosure can be applied to the imaging section 12031 and the like in the configuration described above, for example. Specifically, the imaging device 1 or 2 may be applied to the imaging section 12031. By applying the technology according to the present disclosure, a captured image with stable imaging performance can be obtained, and thus, safety can be improved.

Note that the present technology can also be embodied in the configurations as described below.

(1) An imaging device including:
   a photoelectric conversion element;
   a signal converting unit that converts electric charge transferred from the photoelectric conversion element into a pixel signal;
   a source follower circuit that amplifies the pixel signal;
   a monitoring circuit that monitors a voltage of the source follower circuit;

a comparator that outputs a result of comparison between the pixel signal input via the source follower circuit, and a ramp signal; and
a correcting circuit that corrects the ramp signal on the basis of an output of the monitoring circuit.
(2) The imaging device according to (1), in which
the source follower circuit includes a first transistor and a second transistor connected in series to the first transistor,
a gate of the first transistor is connected to the signal converting unit, and
a source of the first transistor and a drain of the second transistor are connected to a non-inverting input terminal of the comparator.
(3) The imaging device according to (2), in which
the monitoring circuit includes a third transistor and a fourth transistor connected in series to the third transistor,
a gate and a drain of the third transistor are connected to a power supply line, and
a source of the third transistor and a drain of the fourth transistor are connected to the correcting circuit.
(4) The imaging device according to (3), in which
the third transistor is equal in size to the first transistor, and
the fourth transistor is equal in size to the second transistor.
(5) The imaging device according to (4), in which
a gate-source threshold voltage of the third transistor is equal to a gate-source threshold voltage of the first transistor, and
a gate-source threshold voltage of the fourth transistor is equal to a gate-source threshold voltage of the second transistor.
(6) The imaging device according to (3), in which
the correcting circuit includes:
an operational amplifier that is connected to the source of the third transistor and the drain of the fourth transistor; and
a current adjustment element that adjusts a current in accordance with a voltage level of an output terminal of the operational amplifier.
(7) The imaging device according to (6), in which the current adjustment element includes a P-channel MOSFET, and the output terminal of the operational amplifier is connected to a gate of the P-channel MOSFET.
(8) The imaging device according to (1), in which
the correcting circuit includes:
an AD converter that converts an output value of the monitoring circuit into a digital value; and
a memory that temporarily stores the digital value.
(9) The imaging device according to (1), in which
the photoelectric conversion element, the signal converting unit, the source follower circuit, the monitoring circuit, and part of the comparator are disposed on a first semiconductor substrate, and
a portion of the comparator excluding the part of the comparator, and the correcting circuit are disposed on a second semiconductor substrate stacked on the first semiconductor substrate.
(10) The imaging device according to (9), in which
the comparator includes:
a differential transistor pair to which both the pixel signal and the ramp signal are input;
a current source transistor that is connected in series to the differential transistor pair; and
a current mirror circuit that is connected in series to the differential transistor pair, and
the differential transistor pair and the current source transistor are disposed on the first semiconductor substrate, and the current mirror circuit is disposed on the second semiconductor substrate.
(11) The imaging device according to (1), in which
a plurality of the photoelectric conversion elements is two-dimensionally arranged, and
a plurality of the comparators as many as the plurality of the photoelectric conversion elements is provided.
(12) The imaging device according to (1), further including a RAMP generating circuit that generates the ramp signal on the basis of a result of correction performed by the correcting circuit.

REFERENCE SIGNS LIST 1, 2 Imaging device
4 Distance measuring system
20 Pixel array
21 Pixel
30 Signal processing circuit
110 First semiconductor substrate
120 Second semiconductor substrate
202 SF circuit
203 Monitoring circuit
204 Comparator
205 Correcting circuit
206 RAMP generating circuit
211 Photodiode
213 FD
214 Node
221 Amplification transistor (first transistor)
222 Amplification transistor (second transistor)
231 Amplification transistor (third transistor)
232 Amplification transistor (fourth transistor)
241 Differential transistor pair
242 Current source transistor
243 Current mirror circuit
250 Correcting circuit
251 Operational amplifier
252 Current adjustment element
253 AD converter
254 Memory

The invention claimed is:
1. An imaging device, comprising:
a first semiconductor substrate and a second semiconductor substrate, wherein the second semiconductor substrate is on the first semiconductor substrate;
a photoelectric conversion element configured to transfer electric charge;
a signal converting unit configured to convert the electric charge transferred from the photoelectric conversion element into a pixel signal;
a source follower circuit configured to amplify the pixel signal;
a monitoring circuit configured to monitor a voltage of the source follower circuit;
a comparator configured to:
compare the amplified pixel signal and a ramp signal; and
output a result of the comparison between the amplified pixel signal and the ramp signal; and
a correcting circuit configured to correct the ramp signal based on an output of the monitoring circuit, wherein the photoelectric conversion element, the signal converting unit, the source follower circuit, the monitoring circuit, and a part of the comparator are on the first semiconductor substrate, and a portion of the comparator excluding the part of the comparator, and the correcting circuit are on the second semiconductor substrate.

2. The imaging device according to claim 1, wherein
the source follower circuit includes a first transistor and a second transistor connected in series to the first transistor,
a gate of the first transistor is connected to the signal converting unit, and
a source of the first transistor and a drain of the second transistor are connected to a non-inverting input terminal of the comparator.

3. The imaging device according to claim 2, further comprising a power supply line, wherein
the monitoring circuit includes a third transistor and a fourth transistor connected in series to the third transistor,
a gate and a drain of the third transistor are connected to the power supply line, and
a source of the third transistor and a drain of the fourth transistor are connected to the correcting circuit.

4. The imaging device according to claim 3, wherein
a size of the third transistor is equal to a size of the first transistor, and
a size of the fourth transistor is equal to a size of the second transistor.

5. The imaging device according to claim 4, wherein
a gate-source threshold voltage of the third transistor is equal to a gate-source threshold voltage of the first transistor, and
a gate-source threshold voltage of the fourth transistor is equal to a gate-source threshold voltage of the second transistor.

6. The imaging device according to claim 3, wherein
the correcting circuit includes:
an operational amplifier connected to the source of the third transistor and the drain of the fourth transistor; and a current adjustment element configured to adjust a current based on a voltage level of an output terminal of the operational amplifier.

7. The imaging device according to claim 6, wherein the current adjustment element includes a P-channel MOSFET, and the output terminal of the operational amplifier is connected to a gate of the P-channel MOSFET.

8. The imaging device according to claim 1, wherein the correcting circuit includes:
an AD converter configured to convert an output value of the monitoring circuit into a digital value; and
a memory configured to temporarily store the digital value.

9. The imaging device according to claim 1, wherein the comparator includes:
a differential transistor pair to which both the pixel signal and the ramp signal are input;
a current source transistor connected in series to the differential transistor pair; and
a current mirror circuit connected in series to the differential transistor pair, wherein
the differential transistor pair and the current source transistor are on the first semiconductor substrate, and
the current mirror circuit is on the second semiconductor substrate.

10. The imaging device according to claim 1, further comprising:
a plurality of photoelectric conversion elements in a two-dimensional arrangement, wherein the plurality of photoelectric conversion elements includes the photoelectric conversion element; and
a plurality of comparators, wherein
the plurality of comparators includes the comparator, and
a number of the plurality of comparators is equal to a number of the plurality of photoelectric conversion element.

11. The imaging device according to claim 1, further comprising a RAMP generating circuit configured to generate a new ramp signal based on the corrected ramp signal.

* * * * *